United States Patent [19]

Satoh et al.

[11] Patent Number: 5,157,987
[45] Date of Patent: Oct. 27, 1992

[54] TIE ROD DEVICE

[75] Inventors: Shiro Satoh; Takashi Takeuchi; Koji Shibuya; Tetsuya Kogo, all of Saitama, Japan

[73] Assignee: Honda Giken Kogyo Kabushiki Kaisha, Tokyo, Japan

[21] Appl. No.: 449,241

[22] Filed: Dec. 7, 1989

Related U.S. Application Data

[63] Continuation of Ser. No. 040,337, Apr. 20, 1987, abandoned.

[30] Foreign Application Priority Data

Apr. 18, 1986 [JP] Japan .............................. 61-58320[U]

[51] Int. Cl.⁵ .............................................. G05G 1/00
[52] U.S. Cl. ..................................... 74/581; 74/579 R; 74/583; 188/317; 280/95.1
[58] Field of Search ................. 74/586, 581, 583, 519, 74/579 R; 280/95.1 R, 846, 673, 96.1; 188/282, 314, 317; 403/220, 337

[56] References Cited

U.S. PATENT DOCUMENTS

| | | | |
|---|---|---|---|
| 1,867,364 | 7/1932 | Lee | 74/581 X |
| 1,935,521 | 11/1933 | Piotrowski | 74/579 X |
| 2,360,748 | 10/1944 | Whisler, Jr. et al. | 188/96 X |
| 2,719,611 | 10/1955 | Bourcier | 188/314 |
| 2,752,149 | 6/1956 | Forcellini | 188/314 X |
| 3,109,418 | 11/1963 | Exline et al. | 188/317 X |
| 3,109,668 | 11/1963 | Sampietro | 280/95 R |
| 3,113,787 | 12/1963 | Lauderdale | 280/95 R |
| 3,167,309 | 1/1965 | Wossner | 188/317 X |
| 3,693,999 | 9/1972 | Wood, Jr. | 280/95 R |
| 3,834,727 | 9/1974 | Adams | 280/95 R |
| 4,010,829 | 3/1977 | Naito et al. | 188/314 X |
| 4,030,713 | 6/1977 | Palmer | 267/8 R |
| 4,036,319 | 7/1977 | Andre | 188/317 X |
| 4,076,276 | 2/1978 | Wijnhoven | 280/714 |
| 4,105,193 | 8/1978 | Long | 267/64 R |
| 4,106,596 | 8/1978 | Hausmann | 188/314 |
| 4,203,507 | 5/1980 | Tomita | 188/317 |
| 4,241,816 | 12/1980 | Hubrecht et al. | 188/314 X |
| 4,442,926 | 4/1984 | Muto | 188/317 |
| 4,588,198 | 5/1986 | Kanazawa et al. | 280/90 |
| 4,614,255 | 9/1986 | Morita et al. | 188/314 X |
| 4,635,766 | 1/1987 | Street, Jr. | 188/317 |

FOREIGN PATENT DOCUMENTS

| | | | |
|---|---|---|---|
| 1105120 | 11/1955 | France | 74/583 |
| 45-9404 | 4/1970 | Japan. | |

Primary Examiner—Rodney M. Lindsey
Attorney, Agent, or Firm—Lyon & Lyon

[57] ABSTRACT

A tie rod device includes a vibration-absorbing damper. The tie rod comprises a tie rod assembly comprising first and second rods for interconnecting a rack shaft and a knuckle. The vibration-absorbing damper is interposed between the first and second rods for absorbing vibration transmitted from the knuckle.

3 Claims, 3 Drawing Sheets

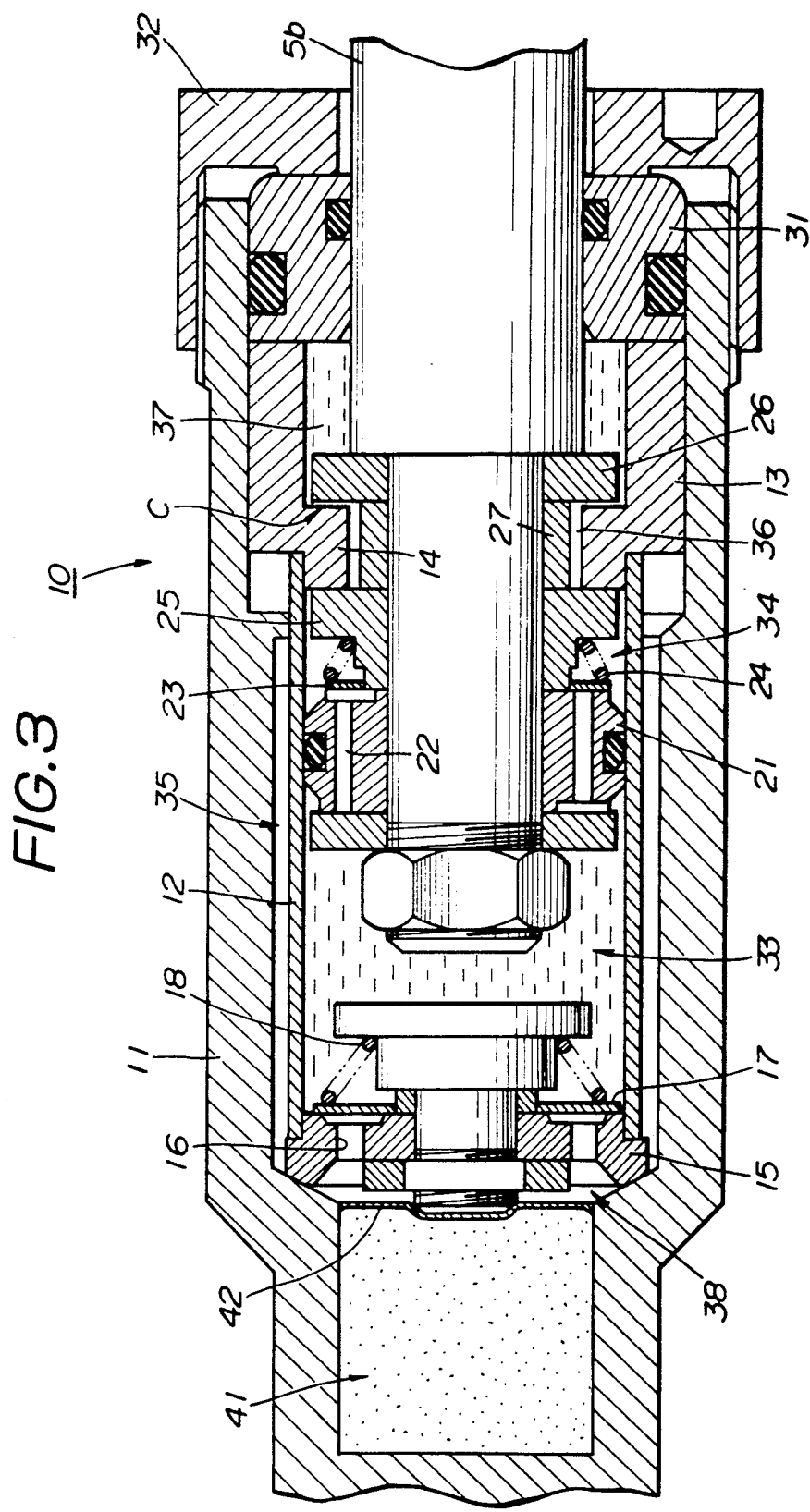

TIE ROD DEVICE

This is a continuation of co-pending application Ser. No. 040,337 filed on Apr. 20, 1987 now abandoned.

BACKGROUND OF THE INVENTION

1. Field of the Invention:

The present invention relates to a tie rod device for use in a steering mechanism of an automotive vehicle.

2. Description of the Relevant Art:

While an automotive vehicle is running, the vibration of front tires is transmitted through knuckle arms and a steering gear to a steering shaft, causing a steering wheel to vibrate in the direction in which the steering wheel is turned. Such a phenomeon is called "steering shimmy".

One conventional steering device designed to reduce the steering shimmy is disclosed in Japanese Patent Publication No. 45-9404. The disclosed steering device has a rack housing including a cylinder and a rack shaft movable axially in the rack housing. The rack shaft includes a piston having an orifice and slidably movable in the cylinder of the rack housing. The cylinder defines hermetically sealed chambers one on each side of the piston, thus providing a vibration-absorbing damper.

However, the path along which vibration is transmitted from the knuckles through the tie rods and the rack shaft to the steering shaft remains unchanged, i.e., the vibration-absorbing means or damper is not disposed in the vibration transmitting path. Therefore, the earlier steering device fails to effectively absorb the steering shimmy or vibration. Moreover, since the damper is integrally formed with the gear box, maintenance of the damper cannot easily be effected, and it would be difficult to install the damper in an existing steering device which has no vibration-absorbing means.

SUMMARY OF THE INVENTION

It is an object of the present invention to provide a tie rod device which can effectively prevent steering shimmy, can well be maintained, and can easily be installed in an existing steering device.

According to the present invention, a tie rod device comprises a tie rod assembly for interconnecting a steering gear box and a knuckle, and vibration-absorbing means disposed in the tie rod assembly.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
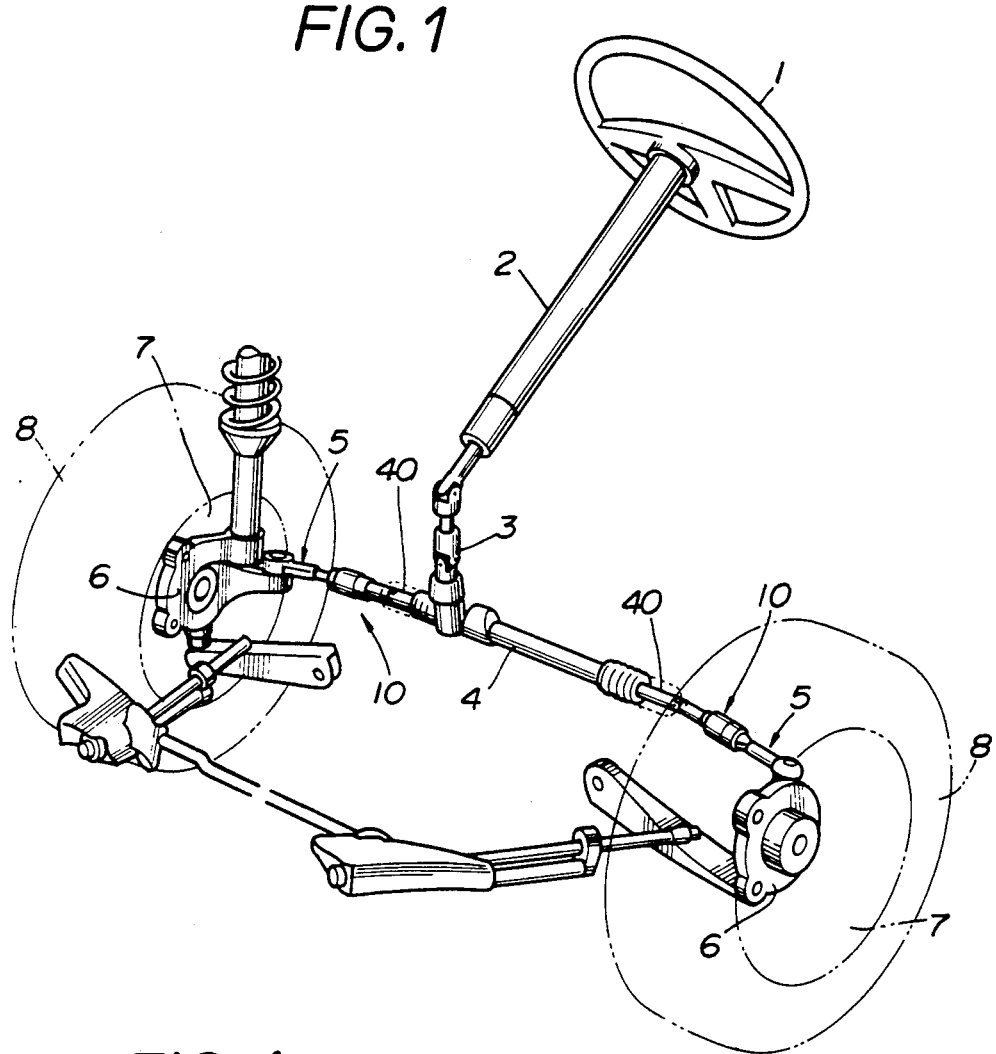
FIG. 1 is a perspective view of a steering mechanism having tie rod devices according to the present invention.

FIG. 1 illustrates a front wheel steering mechanism in an automotive vehicle. Turning movement of a steering wheel 1 is transmitted through a steering shaft 2 to a pinion shaft 3, and then converted by a steering gear box 4 to axial linear movement of a rack shaft 40. The axial movement of rack shaft 40 is transmitted via tie rods 5 to knuckles 6 for steering front wheels 7 rotatably supported on the knuckles 6. The tie rods 5 interconnect the rack shaft 40 axially slidably supported by the steering gear box 4 and the knuckles 6.

Figure 2:
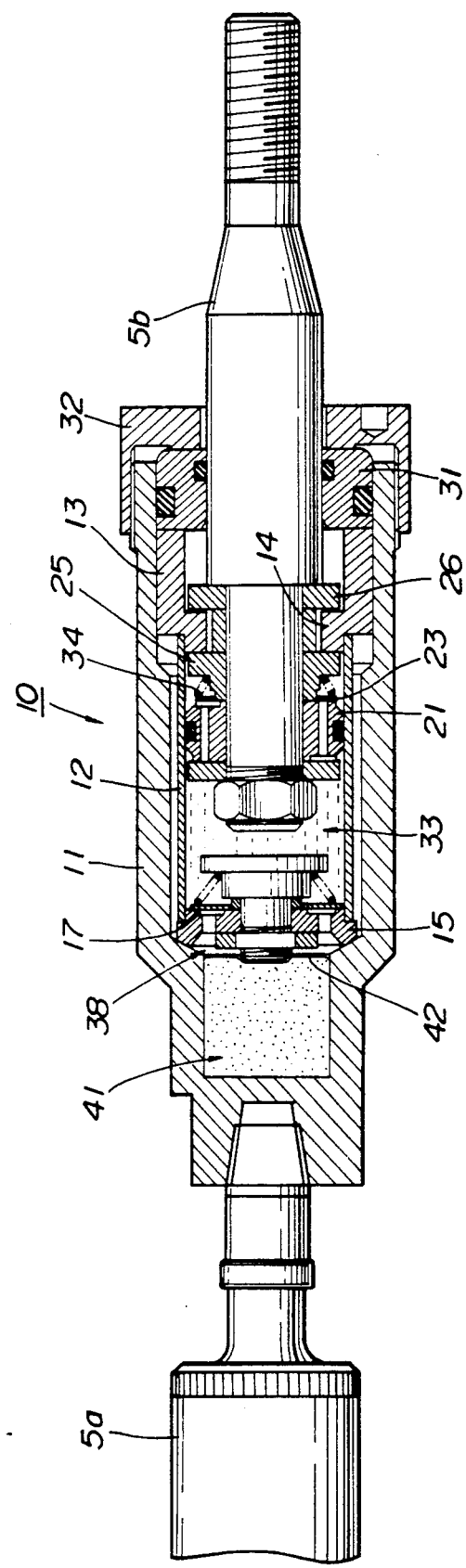
FIG. 2 is a cross-sectional view of the tie rod device.
Figure 3:
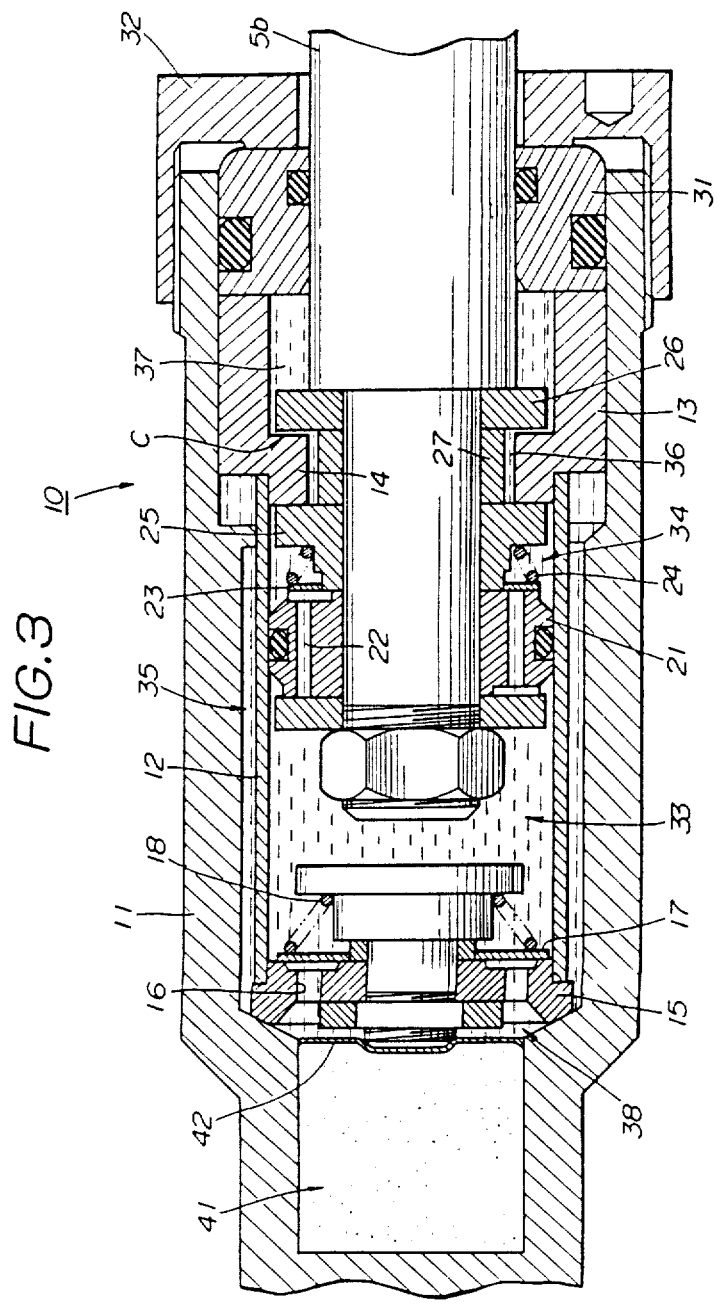
FIG. 3 is an enlarged cross-sectional view of the tie rod device.

As illustrated in FIGS. 2 and 3, each of the tie rods 5 comprises two rods 5a, 5b between which a hydraulic damper 10 is disposed as a vibration-absorbing means.

The hydraulic damper 10 comprises a damper case 11 mounted on one end of the rod 5a, a cylinder 12 disposed in the damper case 11 parallel to the rod 5b, a piston 21 mounted on one end of the rod 5b and slidably fitted in the cylinder 12, a bottom piece 15 fixed to one end of the cylinder 12, a rod guide 31 positioned in one end of the damper case 11 in hermetically sealing relation thereto and guiding the rod 5b slidably therethrough, and an end piece 32 mounted on said one end of the damper case 11 adjacent to the rod guide 31.

A cylinder guide 13 is interposed between the cylinder 12 and the rod guide 31 which are located in the damper case 11. The cylinder guide 13 includes a rebound stopper 14 integrally formed with one end thereof. The interior space of the cylinder 12 is divided by the piston 21 into hydraulic chambers 33, 34. A reservoir chamber 35 is defined between the outer periphery of the cylinder 12 and the inner periphery of the damper case 11.

The bottom piece 15 has orifices 16, a bottom valve 17, and a valve spring 18. The piston 21 has orifices 22, a piston valve 23, and a valve spring 24. Over the rod 5b, there are fitted a first rebound seat 25 adjacent to the piston 21 and a second rebound seat 26 axially spaced from the first rebound seat 25. A collar 27 is axially interposed between the first and second rebound seats 25, 26 and fitted over the rod 5b, the collar 27 being positioned radially inwardly of the rebound stopper 14.

The axial distance between the rebound seats 25, 26 is made slightly larger than the axial thickness of the rebound stopper 14 by the collar 27 disposed between the rebound seats 25, 26, thereby providing a small clearance C between the rebound stopper 14 and the rebound seats 25, 26.

A hydraulic passage 36 is defined radially between the rebound stopper 14 and the collar 27, and a hydraulic passage 37 is defined axially between the rebound seat 26 and the rod guide 31. A hydraulic chamber 38 is defined in the damper case 11 behind the bottom piece 15 remotely from the hydraulic chamber 33. The damper case 11 also has an air chamber 41 which is separated from the hydraulic chamber 38 by means of an intervening rubber diaphragm 42 fixedly mounted in the damper case 11 closely to rod 5a.

Operation of the tie rod device thus constructed is as follows:

The steering tie rods 5 lie substantially horizontally as shown. The air chamber 41 defined in one axial end of the hydraulic damper 10 and separated from the hydraulic chamber 38 by the diaphragm 42 is effective in absorbing thermal expansion of oil in the hydraulic damper 10 because the air chamber 41 is variable in volume.

While the automotive vehicle is running, vibration from tires 8 on the front wheels 7 is transmitted through the steering knuckles 6 to the steering tie rods 5. Such transmitted vibration is absorbed by the hydraulic damper 10 in each of the steering tie rods 5.

More specifically, the hydraulic damper 10 is axially compressible and expandable over a stroke corresponding to the small clearance C between the rebound stopper 14 and the rebound seats 25, 26. The vibration transmitted from the knuckle 6 to the rod 5b is absorbed depending upon the direction of movement of the piston 21 either (1) when the piston valve 23 is opened, oil flows through the orifice 22 between the hydraulic chamber 33 and the hydraulic chamber 34 or (2) when the bottom valve 17 is opened, oil flows through the orifice 16 between the hydraulic chamber 33 and the hydraulic chamber 38. At the same, the hydraulic damper 10 produces a dampening force.

When the steering wheel 1 is turned to steer the front wheels 7, the tie rods 5 are moved over a stroke larger than the small clearance C. Therefore, one of the rebound seats 25, 26 abuts against the rebound stopper 14, and the rods 5a, 5b of the tie rod 5 are moved together with the hydraulic damper 10 therebetween for thereby steering the front wheels 7 in the usual manner.

Figure 4:
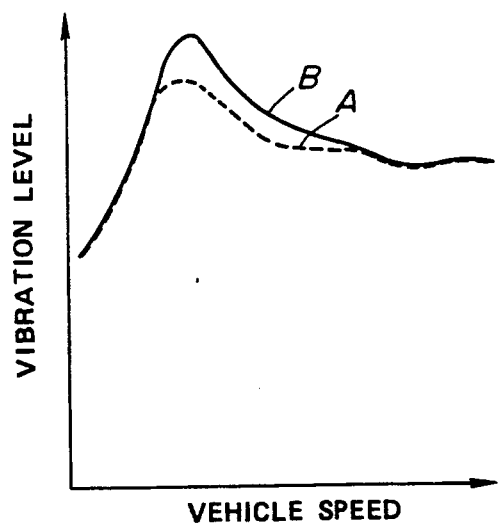
FIG. 4 is a graph showing vibration levels plotted against vehicle speeds.

FIG. 4 shows vibration levels plotted against vehicle speeds. A characteristic curve A indicates vibration levels attained by the tie rod device according to the present invention. A characteristic curve B represents vibration levels produced when no damper was used. It is clear from FIG. 4 that vibration transmitted from the front wheels can be suppressed by the tie rod device of the present invention.

With the present invention, since vibration transmitted from the tires can be absorbed by the tie rods before being transmitted to the rack shaft, steering shimmy can effectively be reduced.

Steering shimmy in an existing automotive vehicle can easily be lowered in level simply by replacing its tie rods with tie rods of the present invention. Where the hydraulic damper of the type in which air and oil are separately filled is employed as illustrated, thermal expansion of oil is reliably absorbed by the air chamber.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

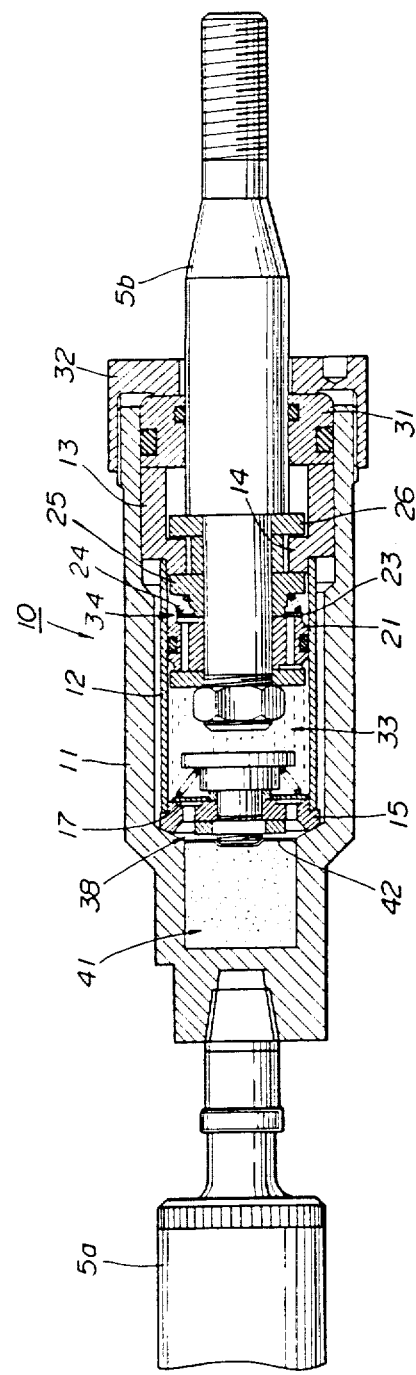

We claim:

1. A tie rod device for use with a steering mechanism having a rack shaft and a knuckle, comprising:
   a tie rod assembly comprising first and second rods for interconnecting the rack shaft and the knuckle, said first and second rods being connected to the rack shaft and the knuckle respectively; and
   vibration-absorbing means interposed between said first and second rods for absorbing vibration transmitted from the knuckle, said vibration-absorbing means comprising a hydraulic damper in which hydraulic and pneumatic mediums are separately filled and are axially compressible and expandable over a predetermined stroke, such that relative axial movement between said first and second rods is limited within the predetermined stroke and said first and second rods move axially together with said hydraulic damper over a stroke larger than the predetermined stroke.

2. A tie rod device according to claim 1, wherein said hydraulic damper comprises a damper case mounted on one end of said first rod, a rod guide hermetically sealing an end of said damper case and defining a hydraulic chamber in said damper case, said second rod being slidably supported on said rod guide, a cylinder disposed in said damper case parallel to said second rod, a piston mounted on one end of said second rod and slidably fitted in said cylinder within said hydraulic chamber, said piston having an orifice, a bottom piece having an orifice and covering an end of said cylinder closely to said first rod, a pneumatic chamber defined in said damper case more closely to said first rod than said bottom piece, and a diaphragm separating said hydraulic chamber and said pneumatic chamber from each other.

3. A tie rod device according to claim 2, wherein said hydraulic damper further includes a first rebound seat fitted over said second rod adjacent to said piston, a second rebound seat fitted over said second rod and spaced from said first rebound seat, and a rebound stopper fixedly mounted in said damper case and positioned between said first and second rebound seats with a small clearance therebetween.

* * * * *

UNITED STATES PATENT AND TRADEMARK OFFICE
CERTIFICATE OF CORRECTION

PATENT NO. : 5,157,987
DATED      : October 27, 1992
INVENTOR(S): Shiro Satoh   et al It is certified that error appears in the above-indentified patent and that said Letters Patent is hereby corrected as shown below:

The drawing sheets, consisting of Figs. 2 and 3, should be deleted to be replaced with the drawing sheets, consisting of Figs. 2 and 3, as shown on the attached page.

Signed and Sealed this

Eighth Day of February, 1994

Attest:

BRUCE LEHMAN

Attesting Officer

Commissioner of Patents and Trademarks